United States Patent
Kumeuchi et al.

(10) Patent No.: US 11,208,007 B2
(45) Date of Patent: Dec. 28, 2021

(54) DIRECT CURRENT POWER SUPPLY CIRCUIT MOUNTED IN WORKING VEHICLE

(71) Applicant: TAKEUCHI MFG. CO., LTD., Nagano (JP)

(72) Inventors: Kengo Kumeuchi, Nagano (JP); Shumpei Okutani, Nagano (JP); Tetsuya Matsumoto, Nagano (JP)

(73) Assignee: TAKEUCHI MFG. CO., LTD., Nagano (JP)

( * ) Notice: Subject to any disclaimer, the term of this patent is extended or adjusted under 35 U.S.C. 154(b) by 205 days.

(21) Appl. No.: 16/436,153

(22) Filed: Jun. 10, 2019

(65) Prior Publication Data
US 2020/0290479 A1 Sep. 17, 2020

(30) Foreign Application Priority Data
Mar. 12, 2019 (JP) .............................. JP2019-044969

(51) Int. Cl.
| | |
|---|---|
| *B60L 58/18* | (2019.01) |
| *B60L 50/64* | (2019.01) |
| *H01M 10/42* | (2006.01) |
| *H01M 10/48* | (2006.01) |
| *H02J 7/00* | (2006.01) |

(52) U.S. Cl.
CPC .............. *B60L 58/18* (2019.02); *B60L 50/64* (2019.02); *H01M 10/425* (2013.01);
(Continued)

(58) Field of Classification Search
CPC ...... B60L 58/18; B60L 50/64; B60L 2200/40; B60L 2240/545; B60L 2240/547;
(Continued)

(56) References Cited

U.S. PATENT DOCUMENTS

| | | | |
|---|---|---|---|
| 7,667,342 B2 * | 2/2010 | Matsumoto | B60L 50/15 290/40 C |
| 9,865,901 B2 * | 1/2018 | Hwang | H01M 10/4207 |

(Continued)

FOREIGN PATENT DOCUMENTS

| | | | | |
|---|---|---|---|---|
| JP | 5515997 | | 6/2014 | |
| KR | 20170058040 A | * | 5/2017 | |
| WO | WO-2014030914 A1 | * | 2/2014 | ............. H02H 9/025 |

OTHER PUBLICATIONS

Qiang et al., Battery Management System for Electric Vehicle Applications, Jan. 6, 2006. IEEE pp. 134-138 (Year: 2006).*

(Continued)

*Primary Examiner* — M Baye Diao
(74) *Attorney, Agent, or Firm* — Stephen J. Weyer, Esq.; Stites & Harbison, PLLC

(57) ABSTRACT

There is provided a direct current power supply circuit mounted in a working vehicle with increased safety as compared with related art by a configuration where a main power source is used after a battery management system (BMS) determines that the main power source can be used. A direct current power supply circuit includes a first power source, a switch, a second power source and a first relay, in which the first power source is connected to a battery management system through the first relay so as to supply direct current power, the battery management system is activated by supply of direct current power from the second power source when the switch is turned on, and the first relay is on-controlled when determined that the first power source can be used.

5 Claims, 4 Drawing Sheets

(52) U.S. Cl.
CPC ......... *H01M 10/486* (2013.01); *H02J 7/0026* (2013.01); *B60L 2200/40* (2013.01); *B60L 2240/545* (2013.01); *B60L 2240/547* (2013.01); *B60Y 2200/91* (2013.01); *B60Y 2400/112* (2013.01); *H01M 2010/4271* (2013.01); *H01M 2220/20* (2013.01)

(58) Field of Classification Search
CPC .... B60L 58/20; B60L 3/0046; H01M 10/425; H01M 10/486; H01M 2010/4271; H01M 2220/20; H02J 7/0026; B60Y 2200/91; B60Y 2400/12; Y02E 60/10
USPC ......................................................... 320/134
See application file for complete search history.

(56) References Cited

U.S. PATENT DOCUMENTS

| | | | |
|---|---|---|---|
| 10,263,438 B2* | 4/2019 | Yoon | H02J 7/007 |
| 10,298,006 B2* | 5/2019 | Kim | H02H 3/24 |
| 2009/0173554 A1 | 7/2009 | Masao | |
| 2012/0025615 A1 | 2/2012 | Keom-Gyu | |
| 2015/0069960 A1* | 3/2015 | Kuraishi | H02J 7/0016 320/107 |

OTHER PUBLICATIONS

Extended European Search Report dated Dec. 18, 2019 in Corresponding European Application No. 19180121.6.

* cited by examiner

DIRECT CURRENT POWER SUPPLY CIRCUIT MOUNTED IN WORKING VEHICLE

CROSS-REFERENCE TO RELATED APPLICATION

This application is based upon and claims the benefit of priority of the prior Japanese Patent Application No. P2019-44969, filed on Mar. 12, 2019, and the entire contents of which are incorporated herein by reference.

TECHNICAL FIELD

The present invention relates to a direct current power supply circuit mounted in a working vehicle.

BACKGROUND ART

A battery management system that detects a charging state to control charge/discharge and to perform safety control with respect to secondary cells (batteries) such as lithium-ion rechargeable batteries and nickel metal hydride batteries has been known as related art (PTL 1: Japanese Patent No. 5515997).

The battery management system is introduced to a battery-type working vehicle as an example. Hereinafter, the battery management system may be written as a BMS in the present specification.

SUMMARY OF INVENTION

Technical Problem

Direct current power is supplied to the BMS only by a main power source in related art. However, in a case where the main power source is in an abnormal state, direct current power is not supplied to the BMS in the configuration where direct current power is supplied to the BMS only by the main power source as in the related-art technique, therefore, the BMS is not activated and it is difficult to monitor the state of the main power source. As the main power source supplies direct current power to a drive unit and to the BMS in the battery-type working vehicle, there is a possibility of firing depending on the state of the main power source, which causes a problem that safety of the working vehicle is reduced.

Solution to Problem

In response to the above issue, one or more aspects of the present invention are directed to a direct current power supply circuit mounted in a working vehicle with increased safety as compared with related art by the configuration where the main power source is used after the battery management system (BMS) determines that the main power source can be used.

In view of the above, the following embodiments are described below.

A direct current power supply circuit according to the present invention is mounted in a working vehicle having a drive unit, a controller and a battery management system, which includes a first power source supplying direct current power to the drive unit, a switch activating the battery management system, a second power source connected to the battery management system by turning on the switch and a first relay operating by control of the battery management system, in which the first power source is connected to the battery management system through the first relay so as to supply direct current power, the battery management system is activated by supply of direct current power from the second power source when the switch is turned on, and the first relay is on-controlled when it is determined that the first power source is capable of being used.

According to the above configuration, when an operator turns on the switch, direct current power is supplied from the second power source to the battery management system to activate the battery management system, and it is determined by the battery management system that the first power source is capable of being used. Then, the relay is on-controlled by the battery management system, therefore, direct current power is supplied from the first power source to the battery management system through the relay. Accordingly, it is possible to use the first power source as the main power source after the BMS determines that the first power source is capable of being used.

Advantageous Effects of Invention

According to the present invention, the main power source is used after the battery management system (BMS) determines that the main power source is capable of being used, therefore, the working vehicle can be operated more safely.

DESCRIPTION OF EMBODIMENTS

First Embodiment

Figure 4:
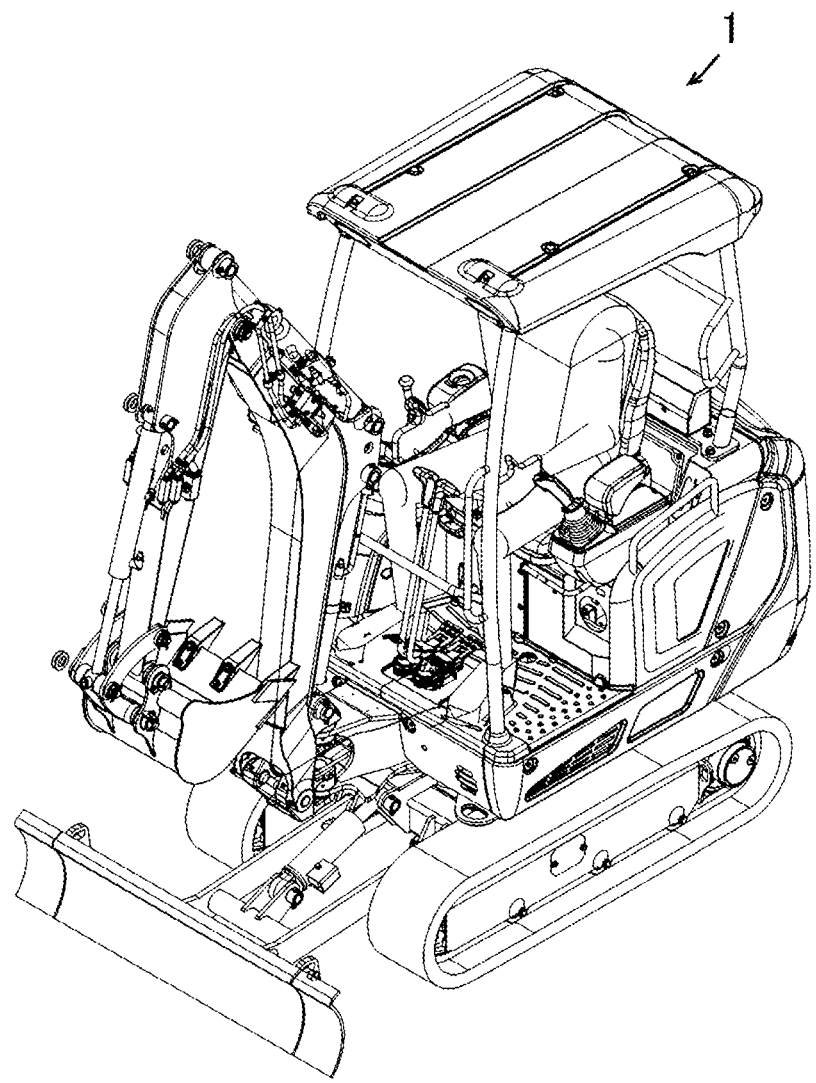
FIG. 4 is a schematic outside drawing showing a working vehicle to which the embodiment is applied.

Hereinafter, a first embodiment according to the present invention will be explained in detail with reference to the drawings. A direct current power supply circuit 10 according to the embodiment is mounted in a working vehicle 1. The working vehicle 1 to which the present embodiment is applied is a battery-type working vehicle as shown in FIG. 4 as an example, including a power shovel, a skit steer loader, a carrier and some other known working vehicles. A drive unit 2 of the working vehicle 1 is an electric actuator such as an electric motor or some other known drive mechanisms. The drive unit 2 is controlled to be driven by a controller 3. In all drawings for explaining the embodiment, the same numerals are added to members having the same functions and repeated explanation thereof may be omitted.

Figure 1:
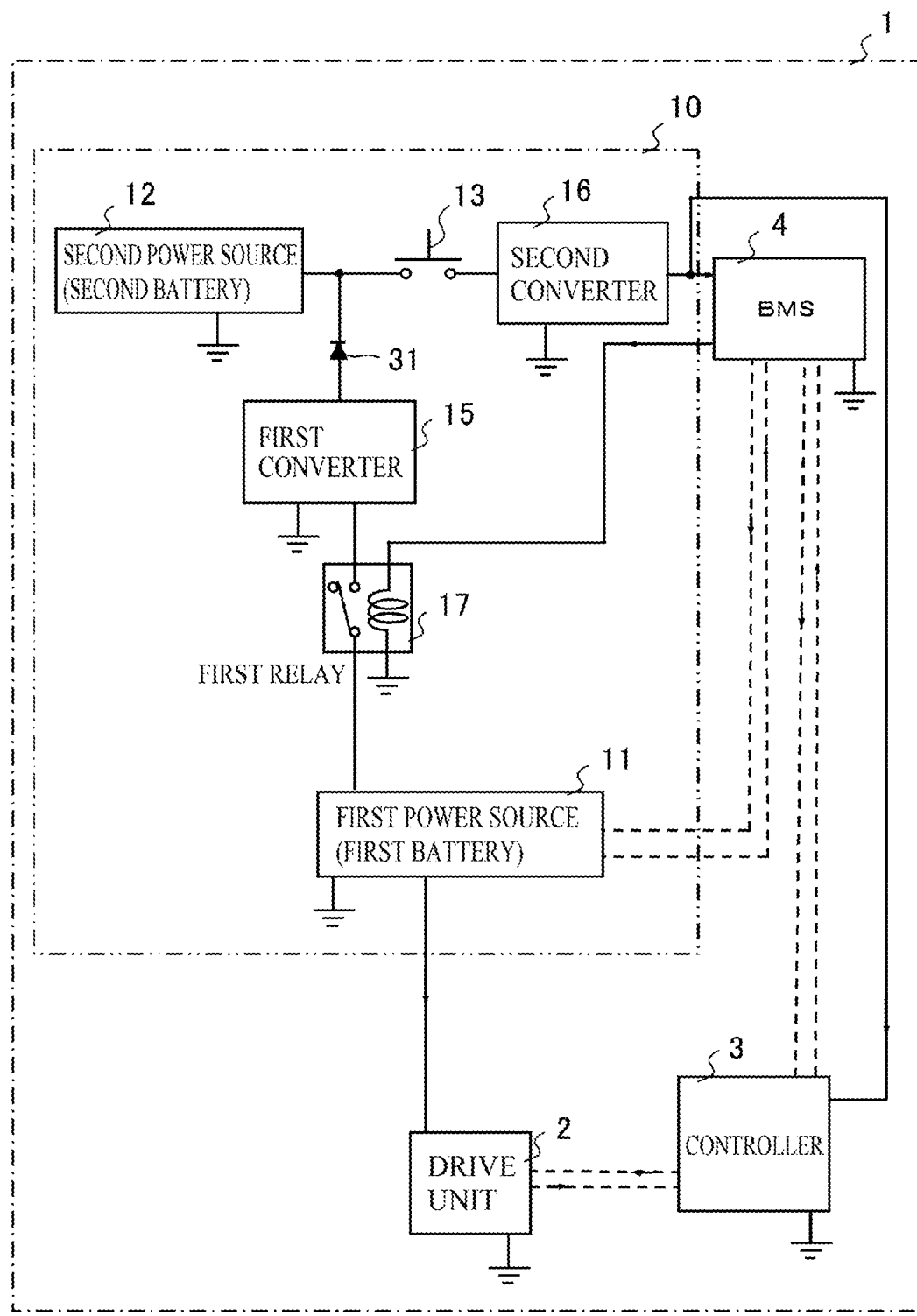
FIG. 1 is a schematic circuit diagram showing a configuration of a direct current power supply circuit mounted in a working vehicle according to a first embodiment of the present invention.

The direct current power supply circuit 10 includes a first power source (first battery) 11 supplying direct current power to the drive unit 2, a switch 13 activating a BMS 4, a second power source (second battery) 12 connected to the BMS 4 by turning on the switch 13, a first relay 17 operating by control of the BMS 4, a first converter 15 connected to the first battery 11 through the first relay 17 and a second converter 16 connected to the second battery 12 by turning on the switch 13 as shown in FIG. 1 as an example.

In the example of FIG. 1, the first battery 11 is connected to the BMS 4 through the first relay 17, the first converter 15, the switch 13 and the second converter 16 so as to supply direct current power. The second battery 12 is connected to the BMS 4 through the switch 13 and the second converter 16 so as to supply direct current power. The first battery 11 and the second battery 12 are respectively connected to the BMS 4 so as to supply direct current power and are connected to the controller 3 so as to supply direct current power. As an example, the switch 13 is a key switch, an activation switch or any of known switches.

As an example, the first battery 11 is a large capacity lithium-ion rechargeable battery in which a large number of cells are combined, and a power supply voltage capable of supplying direct current power is 12 to 600 [V]. Also as an example, the second battery 12 is a small capacity lead-acid battery, and a power supply voltage capable of supplying direct current power is a rated voltage 12 [V] or a rated voltage 24 [V]. According to the configuration, the lead-acid battery excellent in reliability with a past record for being mounted in vehicles is used as an auxiliary power source while using the lithium-ion rechargeable battery capable of obtaining large output with a small size as the main power source, therefore, the working vehicle can be operated more safely.

The first converter 15 and the second converter 16 belong to a kind of a DC-DC converter or a DC chopper, having a function of stepping down and outputting a direct current voltage or a function of stepping up and outputting the direct current voltage. A backflow prevention diode 31 or a given electronic component having a backflow prevention function is arranged on the output side of the first converter 15.

As an example, in the BMS 4 having a configuration of operating at the rated voltage 12 [V], a voltage step down converter is used as the second converter 16 when the second battery 12 is the battery with the rated voltage 24 [V], and the second converter 16 can be omitted when the second battery 12 is the battery with the rated voltage 12 [V]. Also as an example, in the BMS 4 having a configuration of operating at the rated voltage 24 [V], a voltage step up converter is used as the second converter 16 when the second battery 12 is the battery with the rated voltage 12 [V], and the second converter 16 can be omitted when the second battery 12 is the battery with the rated voltage 24 [V]. Also concerning to the first battery 11, the first converter 15 can be omitted in addition to the second converter 16 based on the similar consideration.

That is, when conditions of direct current power supply voltage from the second battery 12 to the BMS 4 match, the second converter 16 can be omitted. The conditions of direct current power supply voltage from the second battery 12 to the BMS 4 match and conditions of direct current power supply voltage from the first battery 11 to the BMS 4 match, the first converter 15 can be omitted in addition to the second battery 16.

As the first relay 17, contact type relays such as an electromagnetic switch, or non-contact type relays such as a MOS-FET relay and a solid-state relay may be adopted.

Figure 3:
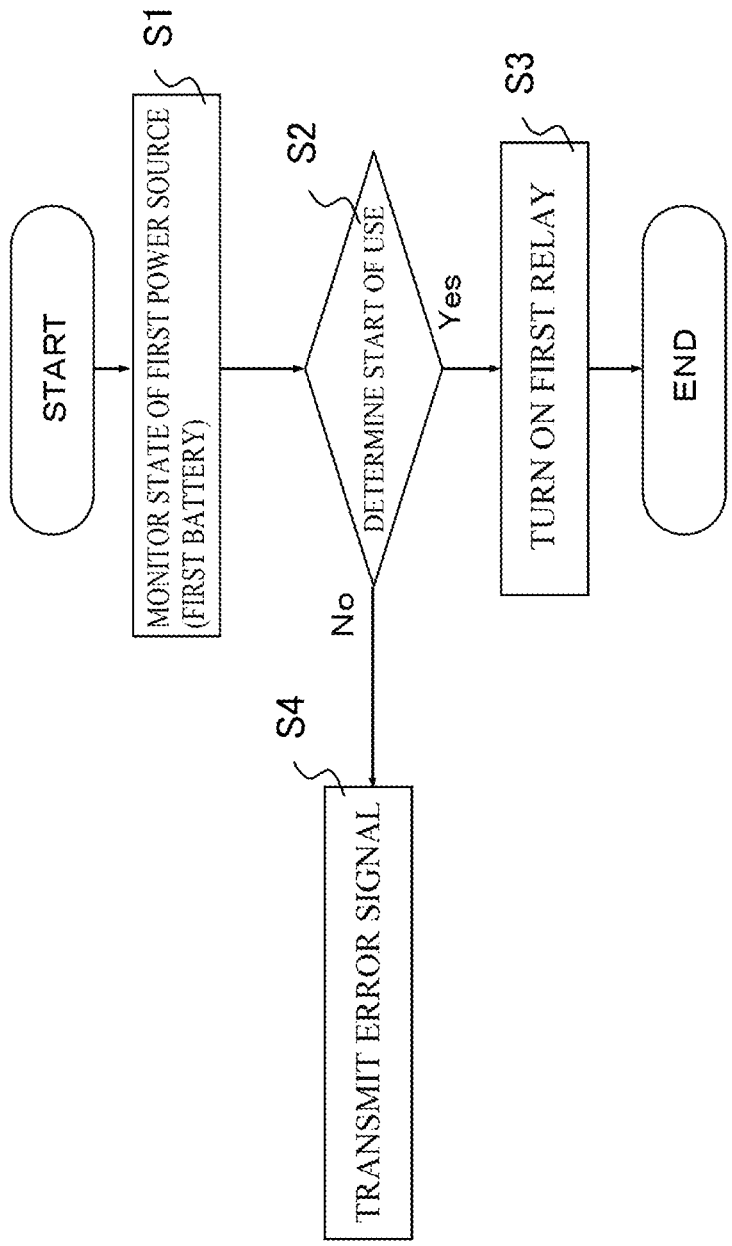
FIG. 3 is a flowchart showing an operation procedure of a BMS according to the embodiment.

FIG. 3 is a flowchart showing an operation procedure to on-control of the relay in the BMS 4 according to the present embodiment. The operation procedure of the direct current power supply circuit mounted in the working vehicle 10 is continuously explained below.

When an operator turns on the switch 13, direct current power is supplied from the second battery 12 to the BMS 4 to activate the BMS 4, and the process enters Step S1 of monitoring the state of the first battery 11. In Step S1 of monitoring the state of the first battery 11, the BMS 4 monitors a voltage and a temperature of the first battery 11 as an example. The voltage and the temperature are monitored by a known monitoring circuit. Moreover, when the operator turns on the switch 13, direct current power is supplied from the second battery 12 to the BMS 4 as well as direct current power is supplied from the second battery 12 to the controller 3 to activate the controller 3. The power supply voltage of the BMS 4 is the rated voltage 12 [V] or the rated voltage 24 [V] as an example. The controller 3 is configured to be operated at the same rated voltage as the BMS 4 as an example.

Continued from Step S1 of monitoring the state of the first battery 11, the process proceeds to Step 2 where the BMS 4 determines start in using the first battery 11. In Step S2 of determining start in using the first battery 11, whether the voltage and the temperature of the first battery 11 are within allowable ranges or not is determined. As an example of determination criteria, a voltage range is 2.5 to 4.2 [V] in single cell. A temperature range is −20 to 60 [° C.]. Then, when it is determined that the voltage and the temperature are within the allowable ranges, the process proceeds to Step S3 of performing on-control of the first relay 17. In Step S3 of performing on-control of the first relay 17, a coil of the first relay 17 is energized to turn on the first relay 17 as an example.

When the first relay 17 is turned on, an output voltage of the first battery 11 is stepped down to a voltage matching with the power supply voltage of the BMS 4 by the first converter 15, and direct current power is supplied from the first battery 11 to the BMS 4. Moreover, when the first relay 17 is turned on, direct current power is supplied from the first battery 11 to the BMS 4 as well as direct current power is supplied from the first battery 11 to the controller 3.

Then, the BMS 4 continues monitoring the state of the first battery 11 while receiving supply of direct current power from the first battery 11. After direct current power can be supplied from the first battery 11 to the BMS 4, the second battery 12 is charged. Accordingly, the small-capacity second battery 12 can suppress power consumption to the minimum and can extend lifetime.

On the other hand, when it is determined that the voltage or the temperature is not within the allowable range in Step S2 of determining start in using the first battery 11, the process proceeds to Step S4 of transmitting an error signal, where the error signal is transmitted to the controller 3.

According to the embodiment, the BMS 4 is activated by the second battery 12 with a smaller capacity than the first battery 11, and determines that the first battery 11 has no problems such as over-discharge, overcharge, a low temperature and a high temperature, and the first battery 11 can be used in such a safe state. Therefore, the working vehicle can be operated safely with no danger of firing or the like. In a case where the BMS 4 determines that there is a problem such as over-discharge, overcharge, a low temperature or a high temperature in the first battery 11, the error signal is transmitted to the controller 3, therefore, safety measures such as stop in using the first battery 11 and an alarm of the operator are taken properly and reliably by the controller 3.

Second Embodiment

Figure 2:
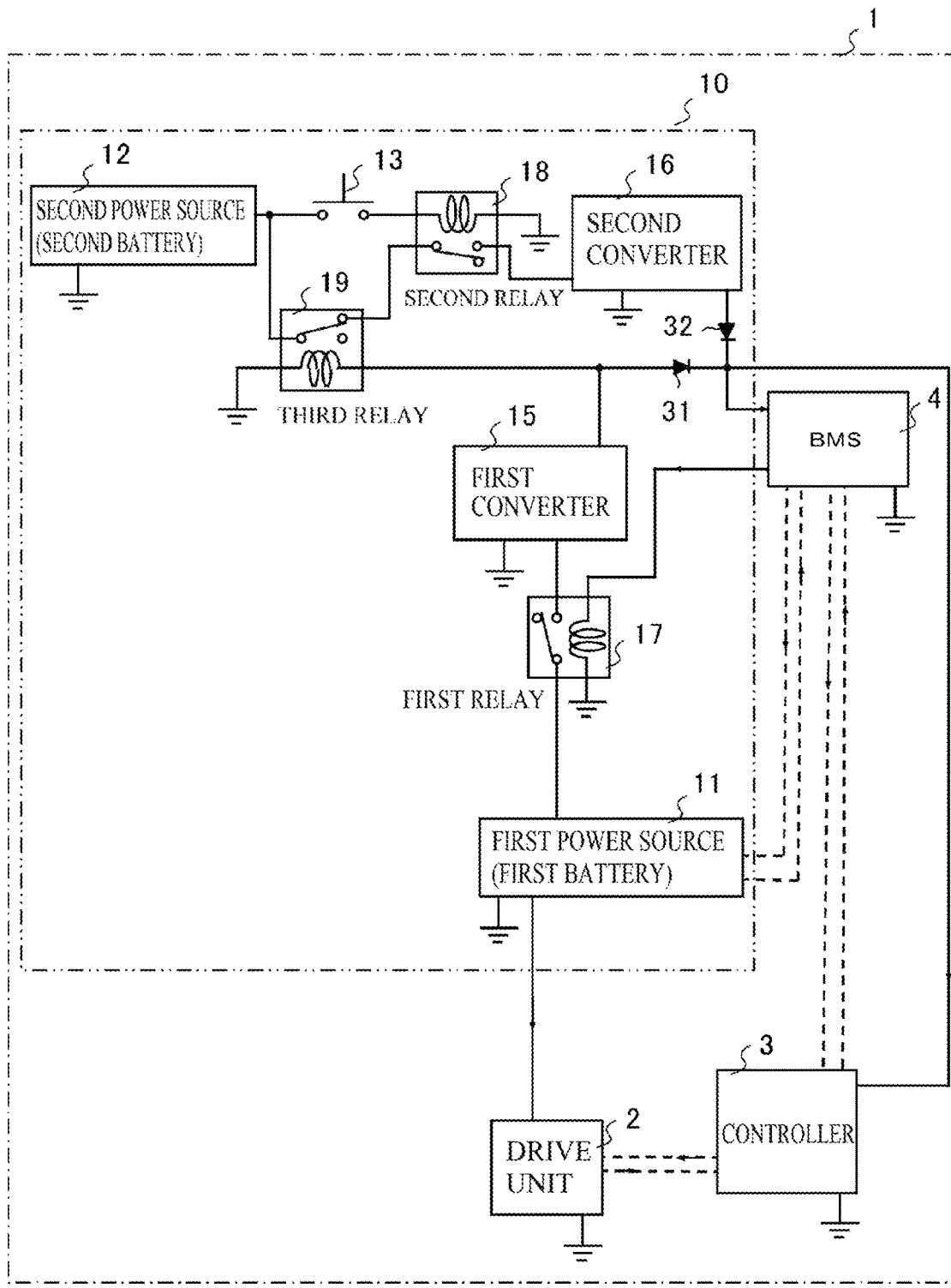
FIG. 2 is a schematic circuit diagram showing a configuration of a direct current power supply circuit mounted in a working vehicle according to a second embodiment of the present invention.

FIG. 2 is a schematic circuit diagram showing a configuration of a direct current power supply circuit mounted in a working vehicle according to a second embodiment. In the second embodiment, points different from the first embodiment will be mainly explained.

The direct current power supply circuit mounted in the working vehicle 10 includes the first power source (first battery) 11 supplying direct current power to the drive unit 2, the switch 13 activating the BMS 4, the second power source (second battery) 12 connected to the BMS 4 by turning on the switch 13, the first relay 17 activated by being controlled by the BMS 4, the first converter 15 connected to the first battery 11 through the first relay 17 and the second converter 16 connected to the second battery 12 by turning on the switch 13, a second relay 18 operating by turning on the switch 13 and a third relay 19 operating when the first relay 17 is operated as shown in FIG. 2 as an example.

In the example of FIG. 2, the first battery 11 is connected to the BMS 4 through the first relay 17 and the first converter 15 so as to supply direct current power. The second battery 12 is connected to the BMS 4 through the third relay 19, the second relay 18 and the second converter 16 so as to supply direct current power. The first battery 11 and the second battery 12 are respectively connected to the BMS 4 so as to supply direct current power as well as connected to the controller 3 so as to supply direct current power.

As the third relay 19 and the second relay 18, contact type relays such as the electromagnetic switch, or non-contact type relays such as the MOS-FET relay and the solid-state relay may be adopted in the same manner as the first relay 17. A backflow prevention diode 32 or a given electronic component having the backflow prevention function is arranged on the output side of the second converter 16.

The operation procedure of the direct current power supply circuit 10 is continuously explained below with reference to a flowchart of FIG. 3.

When an operator turns on the switch 13, a coil of the second relay 18 is energized to turn on the second relay 18 as an example and the third relay 19 is ON with no energization, therefore, direct current power is supplied from the second battery 12 to the BMS 4 through the third relay 19, the second relay 18 and the second converter 16 to activate the BMS 4, and the process enters Step S1 of monitoring the state of the first battery 11. In Step S1 of monitoring the state of the first battery 11, the BMS 4 monitors a voltage and a temperature of the first battery 11 as an example. The voltage and the temperature are monitored by a known monitoring circuit. Moreover, when the operator turns on the switch 13, direct current power is supplied from the second battery 12 to the BMS 4 as well as direct current power is supplied from the second battery 12 to the controller 3 to activate the controller 3.

Continued from Step S1 of monitoring the state of the first battery 11, the process proceeds to Step 2 where the BMS 4 determines start in using the first battery 11. In Step S2 of determining start in using the first battery 11, whether the voltage and the temperature of the first battery 11 are within allowable ranges or not is determined. As an example of determination criteria, a voltage range is 2.5 to 4.2 [V] in single cell. A temperature range is −20 to 60 [° C.]. Then, when it is determined that the voltage and the temperature are within the allowable ranges, the process proceeds to Step S3 of performing on-control of the first relay 17. In Step S3 of performing on-control of the first relay 17, a coil of the first relay 17 is energized to turn on the first relay 17 as an example.

When the first relay 17 is turned on, an output voltage of the first battery 11 is stepped down to a voltage matching with the power supply voltage of the BMS 4 by the first converter 15, and direct current power is supplied from the first battery 11 to the BMS 4. Simultaneously, a coil of the third relay 19 is energized by the first battery 11 to turn off the third relay 19, and the connection between the second battery 12 and the BMS 4 is released as the third relay 19 is turned off. Moreover, when the first relay 17 is turned on, direct current power is supplied from the first battery 11 to the BMS 4 as well as direct current power is supplied from the first battery 11 to the controller 3.

Then, the BMS 4 continues monitoring the state of the first battery 11 while receiving supply of direct current power from the first battery 11.

On the other hand, when it is determined that the voltage or the temperature is not within the allowable range in Step S2 of determining start in using the first battery 11, the process proceeds to Step S4 of transmitting an error signal, where the error signal is transmitted to the controller 3.

As the switch 13 is arranged at a position separated from a direct current power supply line to the BMS 4 in the second embodiment, switching from the second battery 12 to the first battery 11 can be performed more safely and reliably.

In the above embodiments, the configuration in which the first battery 11 and the second battery 12 respectively supply direct current power to the BMS 4 as well as to the controller 3 is shown, however, it is also possible to supply direct current power to BMS 4 after supplying direct current power to the controller 3, or to supply direct current power to the controller 3 after supplying direct current power to the BMS 4.

The above direct current power supply circuit mounted in the working vehicle 10 may be suitably altered according to specifications and so on. The present invention is not limited to the above described embodiments and can be variously altered within a scope not departing from the present invention.

What is claimed is:

1. A working vehicle having a drive unit, a controller connected to the drive unit, a battery management system connected to the controller, a first power source supplying direct current power to the drive unit, a switch activating the battery management system, a second power source connected to the battery management system by turning on the switch and a first relay operating by control of the battery management system,
   wherein the battery management system is connected to the first power source through the first relay so as to supply direct current power, and the second power source is set to have a smaller capacity than the first power source; and wherein the battery management system is activated by supply of direct current power from the second power source when the switch is turned on, and the first relay is on-controlled when it is determined that the first power source is capable of being used, and the first power source and the second power source are respectively connected to the battery management system so as to supply direct current power as well as connected to the controller so as to supply direct current power, and the battery management system monitors a voltage and a temperature of the first power source, and
   wherein the battery management system performing on-control of the first relay and switching off the first power source when it is determined that the voltage or the temperature of the first power source are not within allowable ranges, and wherein the battery management system transmitting an error signal to the controller when it is determined that the voltage or the temperature is not within the allowable range.

2. The working vehicle according to claim 1, wherein the first power source is a lithium-ion battery or a sodium-sulfur battery, and the second power source is a lead-acid battery or a nickel metal hydride battery.

3. The working vehicle according to claim 2, further comprising:
a first converter is connected to the first power source through the first relay, and the first converter having a function of stepping down and outputting the direct current voltage, and
wherein the battery management system is connected to the first power source through the first converter.

4. The working vehicle according to claim 3, further comprising:
a second converter connected to the second power source by turning on the switch,
wherein the battery management system is connected to the second power source through the second converter.

5. The working vehicle according to claim 1, further comprising:
a second relay operating by turning on the switch,
a third relay operating when the first relay is operated, and
wherein the battery management system is connected to the second power source through the second relay, and
wherein the second power source is connected to the battery management system through the third relay so as to supply direct current power, and the connection between the second power source and the battery management system is released by the operation of the third relay.

* * * * *